(No Model.) 2 Sheets—Sheet 1.

H. GASKELL, Jr., & F. HURTER.
MANUFACTURE OF BICARBONATE OF SODA.

No. 276,020. Patented Apr. 17, 1883.

Witnesses:
Philip Mauro
C. J. Hedrick

Inventors
Holbrook Gaskell Jr &
Ferdinand Hurter by
A. Pollok
their attorney.

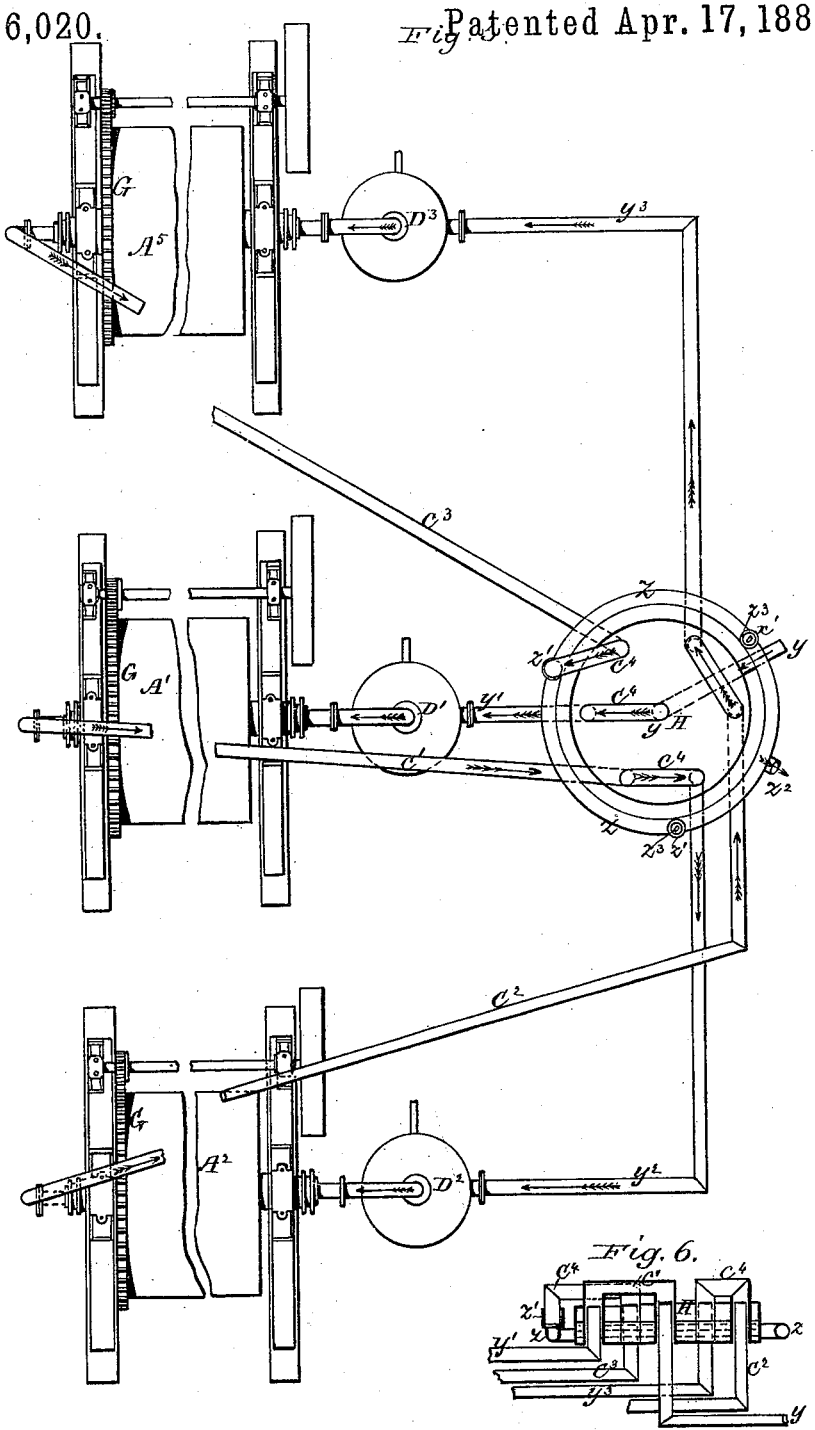

UNITED STATES PATENT OFFICE.

HOLBROOK GASKELL, JR., AND FERDINAND HURTER, OF WIDNES, COUNTY OF LANCASTER, ENGLAND.

MANUFACTURE OF BICARBONATE OF SODA.

SPECIFICATION forming part of Letters Patent No. 276,020, dated April 17, 1883.

Application filed January 18, 1883. (No model.) Patented in England June 17, 1882, No. 2,876.

*To all whom it may concern:*

Be it known that we, HOLBROOK GASKELL, Jr., subject of the Queen of Great Britain and Ireland, and FERDINAND HURTER, Ph. D., a citizen of Switzerland, and both residing at Widnes, in the county of Lancaster, England, have invented certain Improvements in the Manufacture of Bicarbonate of Soda, (for which we have obtained a patent in Great Britain, No. 2,876, dated 17th June, 1882,) of which the following is a specification.

Bicarbonate of soda is usually made by the addition of carbonic acid to decahydrated carbonate of soda, commonly known as "soda crystals," or by the addition of carbonic acid to monohydrated carbonate of soda, known as "salts," for which latter method Letters Patent were granted to us and to Eustace Carey on the 16th day of November, 1881, No. 5,024.

Now, the present invention relates to the employment of anhydrous carbonate of soda (of sufficient purity) in and for the production of bicarbonate of soda; and our improvements consist in adding water (preferably in the form of steam) and carbonic acid to such anhydrous carbonate of soda, contained in suitable apparatus, until it is converted into the desired bicarbonate of soda; or the water or the aqueous vapor may be added first, and thus monohydrate of soda be formed, which monohydrate may afterward, in the same or in another vessel, be converted into bicarbonate of soda by means of carbonic acid; or the water and the carbonic acid may be added simultaneously to the anhydrous carbonate of soda, in order that bicarbonate of soda may be formed. Any suitable anhydrous carbonate of soda may be used—such, for example, as soda-ash or calcined soda crystals.

Figure 2:
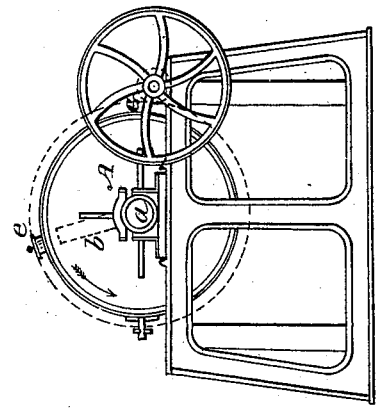
Figure 1:
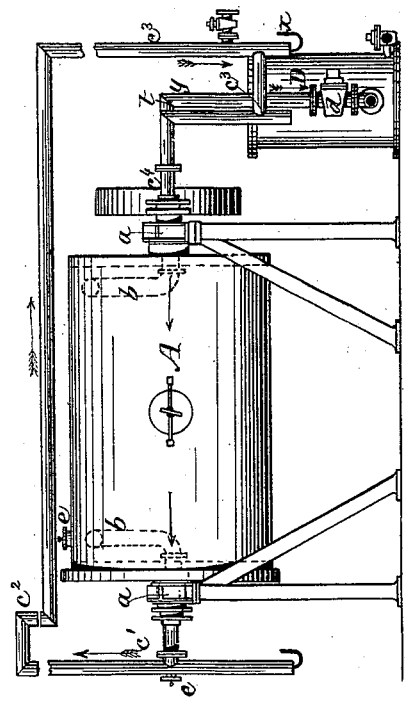
Figure 3:
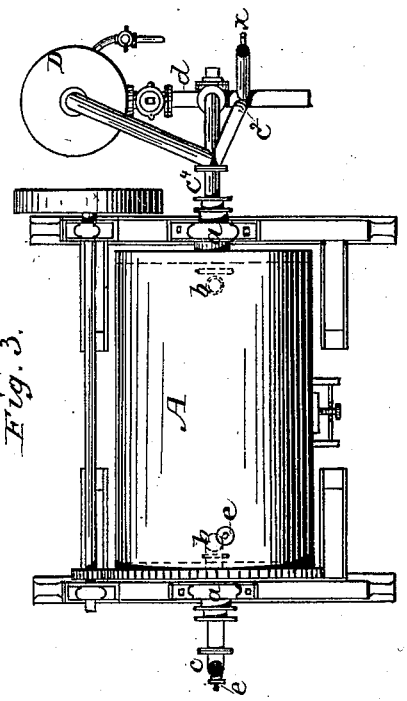

In carrying out our invention we find it advantageous to employ an apparatus such as is illustrated in side elevation, end view, and plan, respectively, in Figures 1, 2, and 3 of the accompanying drawings.

Figure 4:

The iron cylinder A is constructed of convenient size—such as, for example, eight feet long by five and a half feet in diameter—and is capable of being rotated upon a horizontal axis. A cylinder of the above-mentioned size will hold a charge of about twenty-six hundred-weight of the anhydrous carbonate of soda, and produces therefrom about forty hundred-weight of the bicarbonate. The cylinder A is provided with hollow trunnions or axes, supported by and capable of turning in bearings $a$, carried by a suitable frame-work. The hollow axis at one end of the cylinder is used for the admission of steam and carbonic-acid gas, and that at the other end is used for permitting the exit, when desirable, of any superfluous moisture formed thereon. The hollow axles are continued into the interior of the cylinder A and deflected upward, as shown at $b$ in Fig. 1, for the purpose of avoiding the lodgment therein of any solid material, and the consequent stoppage of the free passage of the gas into or from the said cylinder. We find it advisable to have apertures, as represented at $e\,e$, in the cylinder A and exit-pipe, $c$, respectively, which can be closed air-tight in any convenient manner, and through which, when necessary, the part of the exit-pipe $c$ which is inside the cylinder A may be readily cleansed and freed from dust, which is sometimes deposited therein. Outside the cylinder A the exit-pipe $c$ is carried upward, as at $c^2$, to a suitable height, and is then returned downward and connected by the branch $c^3$ with the pipe $c^4$, by which the steam and carbonic acid enter at the opposite end of the cylinder. We find that when the pipe $c$ is carried upward to about thirty feet to meet the branch $c^2$ the difference of temperature, and consequently the specific gravity between the gas in the upcast and that in the downcast of the pipe, is such that a circulation of gas can be commenced and maintained, when desired, through the pipe $c$. In this manner superfluous moisture, if any, is conveyed away from the cylinder A, and is condensed in the pipes, and may be collected and run off through a lute, as shown at $x$, the surplus carbonic-acid gas returning to the cylinder by the branch $c^3$. Fig. 4 shows such arrangement of lute drawn to a larger scale. If at any time the aforesaid circulation should not commence when desired, we open for a few moments a tap provided for the purpose at the bottom of the downcast-pipe, above the lute. By so doing the circulation is at once set up in the pipe $c$, and when commenced continues as long as may be required. Should at any time the surface of the circulating-pipe be insufficient to cool the gas, in order that the moisture may be condensed, a portion of the pipe may be more perfectly cooled by the application of cold water to the exterior of the pipe. The cylinder A is further provided with openings for inserting and withdrawing the matter before and after treatment therein, respectively, suitable covers being provided to fit over such openings.

Having described one form of apparatus for carrying out our process, we will now proceed to describe the method of working the same which we have found by practice to give us the best results.

The charge of anhydrous carbonate of soda is introduced into the cylinder A and through the before-mentioned openings, which are then closed, and the cylinder caused to revolve slowly through the intervention of a pulley and spur-gearing, G, driven by any suitable motor. We find from practice that from two to six revolutions per minute is a sufficient speed. Steam and carbonic acid are then turned on or admitted into the interior of the cylinder A by the pipe $y$, whereupon the temperature of the carbonate of soda is caused to rise and the gaseous mixture is rapidly absorbed. When absorption decreases, the temperature falls. The progress of the operation or process may be ascertained by witdrawing and testing a sample from time to time. We find, however, that with a regular and sufficient supply of carbonic acid and steam the operation (which lasts from about ten to fifteen hours) is sufficiently uniform that after a short experience sampling and testing are usually unnecessary. Toward the end of the operation carbonic-acid gas only is admitted and the steam shut off. Any superfluous moisture which may have been added is withdrawn by means of the circulation-pipe above described, and in due time the bicarbonate will be found completely finished and dry, and when sufficiently cooled, ready for immediate grinding and dressing.

Several methods of carrying out our improvements are, however, possible, and will, under certain circumstances, yield more or less satisfactory results. Such a modified method of procedure may consist in admitting at first steam only to the anhydrous carbonate of soda and agitating the charge so long in an atmosphere of steam until sufficient, or rather more, water has been absorbed to convert the soda into a monohydrate of carbonate of soda. This operation is complete when the charge, on testing, is found to contain from forty-nine to fifty per cent. of soda, ($Na2O$.) The steam is then shut off and carbonic-acid gas permitted to enter the cylinder, and the operation then proceeds as directed in the specification No. 5,024, of 1881, hereinbefore referred to.

The two operations of steaming and carbonating the anhydrous carbonate may be carried out in two separate vessels; but it will usually be found most convenient to employ the same cylinder or vessel for both operations.

We find that when operating with charges of from twenty to thirty hundred-weight of anhydrous carbonate of soda it is preferable to add simultaneously steam and carbonic acid, this being another method of carrying out our improvements. We prefer, however, to pass the carbonic-acid gas (before it reaches the inlet-pipe $y$) to the cylinder A through a small tower, D, or cylinder, about three feet diameter and four to five feet high, contiguous to the cylinder, and filled with coke or other suitable material, into which tower the requisite steam is passed. The admission of steam is so regulated that the gas has a temperature of about 180° Fahrenheit when issuing from the said tower. This may be ascertained by placing the bulb of such a graduated thermometer into the inlet-pipe $y$, as shown at $t$. When the carbonic-acid gas is saturated with steam at this temperature the gaseous mixture consists nearly of equal parts, by volume, of steam and carbonic acid, this being the proportion necessary for the formation of bicarbonate of soda from anhydrous carbonate. In order to insure dry bicarbonate, we remove any excess of moisture which may have been absorbed by or condensed upon the charge by means of the circulating-pipe above described, and at the same moment at which we begin to circulate, as aforesaid, we completely shut off the steam and admit carbonic-acid gas only, which is usually effected about one, two, or three hours before the charge is withdrawn.

If, or when dilute carbonic acid is employed—such as that resulting from the combustion of anthracite or coke—and where an inert gas or gases are present, it is advisable to have two or more cylinders, A, connected together, and so arranged that the inert gas or gases may be permitted to escape without undue loss of carbonic acid. We effect this by having a series of two or more cylinders, and thus pass the exit gas from one cylinder into the next, and so on to the last, the inert gas or gases being allowed to escape freely from the last cylinder of the series. Between each of the cylinders may be provided a gas-drying—i. e., circulating-pipe—and a gas-moistening apparatus—i. e., coke-tower—or their equivalent, so that the exit gas or gases from the one cylinder is or are dried or moistened, as required, on their way to the next cylinder. The gas-pipes can be so arranged, as is well understood, that any one cylinder of the series can be isolated for filling or emptying, or for other similar purpose, as required.

Fig. 5 represents in plan an arrangement of such apparatus as and for the purposes last mentioned. According to this arrangement three cylinders, $A' A^2 A^3$, are employed, which are essentially of the same construction as represented by Figs. 1, 2, and 3. Each of them is capable of revolving independently of the other, suitable gearing, G, being provided for such purpose. The plan shows one method of connecting a series of three cylinders, so that any one of them may be isolated, and this method can easily be similarly adapted to any number of such cylinders. The carbonic-acid gas from any source enters the distributing apparatus H by the central pipe, $y$. This distributing apparatus consists of a cylindrical vessel, through the bottom of which pass, water-tight, the central inlet-pipe, $y$, and three pairs of pipes arranged in a circle round the inlet-pipe, each pair being connected with the inlet and outlet of one of the cylinders $A'$ $A^2$ $A^3$, respectively. The cylindrical vessel H contains a sufficient depth of water to resist any pressure or reaction of the gas. The open ends of the pipes reach above the level of the water a distance at least equal to the depth of the water in the vessel. Movable bent pipes are provided to slip over and connect any one of these pipes with any other.

The drawings represent the whole of the three cylinders $A'$ $A^2$ $A^3$ connected in the following manner: The central inlet-pipe, $y$, is connected to $y'$ by a movable arm, $c^4$, so that the carbonic acid may pass to the moistening apparatus $D'$ and enter into the cylinder $A'$. The gas passes out by the pipe $c'$, which is of sufficient length to cool the gas and condense excess of moisture, and returns to the distributing apparatus H, where the pipe $c'$ is connected to pipe $y^2$ by a movable arm, $c^4$. The gas is thus caused to pass to the moistening apparatus $D^2$, from this to cylinder $A^2$, and returns by pipe $c^2$ to the distributer, where the said pipe is connected by another movable arm, $c^4$, to the pipe $y^3$. The gas finally passes through the moistening apparatus $D^3$ and cylinder $A^3$, and returns again to the distributer H by the pipe $c^3$, and thence it may be allowed to escape by the ring-pipe Z and outlet $Z^2$. If any water should condense in any of the pipes, it is allowed to escape through a lute similar to that previously mentioned, and represented in Fig. 4 of the drawings. If any of the moistening apparatus is not required for moistening purposes, the steam is not turned on thereto.

Fig. 6 shows a section of the distributing apparatus, the drawings showing the pipe $c^3$, connected by a movable arm, $c^4$, to the pipe Z, forming a ring round the distributing apparatus H, the ring-shaped pipe having four branches, $Z'$ $Z^2$. Three of these branches $Z'$ are placed opposite to the termini of the pipes $c'$ $c^2$ $c^3$, respectively, and serve to connect, by means of an arm, $c^4$, any of these pipes to the said ring Z. The fourth branch, $Z^2$, of this ring Z is connected either to a chimney or to an exhauster, which removes the inert gases. All these branches of the pipe Z not in actual use are covered by a lid, as at $Z^3$. All connections are luted with water, as is well understood. When working in this manner with carbonic acid mixed with inert gases the amount of steam to be added depends upon the amount of carbonic acid contained in the gas, and must be varied accordingly.

Having now described the nature of our invention and the means whereby we carry it into effect, we wish it to be observed that we do not confine ourselves to the particular arrangement, form, or dimensions of apparatus hereinbefore described; but

What we consider to be novel and original, and therefore claim as the invention secured to us by the hereinbefore-in-part-recited Letters Patent, is—

The production or manufacture of bicarbonate of soda by subjecting anhydrous carbonate of soda to the action of water or aqueous vapor and of carbonic-acid gas, the water or aqueous vapor being used in the proportion and under the conditions proper to supply the required equivalent to the bicarbonate, so as to produce a dry bicarbonate as the result of the operation, substantially as hereinbefore described.

In testimony whereof we have signed our names to this specification in the presence of two subscribing witnesses.

HOLBROOK GASKELL, Jr.
FERDINAND HURTER.

Witnesses:
ALEXANDER WALKER,
RICHARD MERCER,
*Both of Widnes.*